(12) United States Patent
Mohan et al.

(10) Patent No.: US 9,002,522 B2
(45) Date of Patent: Apr. 7, 2015

(54) LOGICAL GROUPINGS OF INTELLIGENT BUILDING FIXTURES

(75) Inventors: Tanuj Mohan, Mountain View, CA (US); Premal Ashar, Sunnyvale, CA (US); Sanjeev Patel, Santa Clara, CA (US); David Perkins, San Carlos, CA (US)

(73) Assignee: enLighted, Inc., Sunnyvale, CA (US)

( * ) Notice: Subject to any disclaimer, the term of this patent is extended or adjusted under 35 U.S.C. 154(b) by 577 days.

(21) Appl. No.: 13/360,786

(22) Filed: Jan. 29, 2012

(65) Prior Publication Data
US 2012/0130544 A1 May 24, 2012

Related U.S. Application Data

(63) Continuation-in-part of application No. 12/874,331, filed on Sep. 2, 2010, now Pat. No. 8,587,225, which is a continuation-in-part of application No. 12/584,444, filed on Sep. 5, 2009, now Pat. No. 8,457,793.

(60) Provisional application No. 61/191,636, filed on Sep. 10, 2008.

(51) Int. Cl.
*G05B 15/02* (2006.01)
*H05B 37/02* (2006.01)

(52) U.S. Cl.
CPC ........ H05B 37/0218 (2013.01); H05B 37/0227 (2013.01); H05B 37/0245 (2013.01); *Y02B 20/46* (2013.01); *Y02B 20/48* (2013.01)

(58) Field of Classification Search
CPC .............. H05B 37/02; H05B 37/0218; H05B 37/0227; H05B 37/0245; Y02B 20/46; Y02B 20/48; G05B 15/02; Y04S 20/227

USPC ............ 700/19, 20, 275, 276, 277, 278, 295; 315/295, 312

See application file for complete search history.

(56) References Cited

U.S. PATENT DOCUMENTS

| | | | |
|---|---|---|---|
| 4,751,399 A * | 6/1988 | Koehring et al. | ............. 307/117 |
| 5,101,141 A | 3/1992 | Warner et al. | |
| 5,179,324 A | 1/1993 | Audbert | |
| 5,191,265 A | 3/1993 | D'Aleo et al. | |
| 5,283,516 A | 2/1994 | Lohoff | |
| 5,293,097 A * | 3/1994 | Elwell | ........................... 315/154 |
| 5,489,827 A * | 2/1996 | Xia | ............................... 315/294 |
| 5,812,422 A | 9/1998 | Lyons | |
| 6,057,654 A | 5/2000 | Cousy et al. | |
| 6,188,177 B1 * | 2/2001 | Adamson et al. | ............. 315/149 |
| 6,188,181 B1 | 2/2001 | Sinha et al. | |
| 6,342,994 B1 | 1/2002 | Cousy et al. | |
| 6,548,967 B1 | 4/2003 | Dowling et al. | |
| 6,896,388 B2 * | 5/2005 | George et al. | ................... 362/84 |
| 7,255,454 B2 * | 8/2007 | Peterson | ....................... 362/147 |

(Continued)

*Primary Examiner* — Charles Kasenge
(74) *Attorney, Agent, or Firm* — Brian R. Short

(57) ABSTRACT

Methods, apparatuses and systems of building control, are disclosed. One system includes a plurality of building fixtures and at least one sensor interfaced with at least one of the plurality of building fixtures. Further, each building fixture includes a communication port and a controller. For this embodiment, each controller is configured to independently control at least one of an environmental load or a security device, either receive or help designate the building fixture as belonging to a logical group of building fixtures, and share at least one of sensor or state information with other building fixtures within the logical group of building fixtures, through the communication port.

40 Claims, 10 Drawing Sheets

(56) References Cited

U.S. PATENT DOCUMENTS

| | | |
|---|---|---|
| 7,309,985 B2 | 12/2007 | Eggers et al. |
| 7,315,258 B2 * | 1/2008 | Dawson ................... 340/870.07 |
| 7,348,736 B2 | 3/2008 | Piepgras et al. |
| 7,382,271 B2 | 6/2008 | McFarland |
| 7,437,596 B2 | 10/2008 | McFarland |
| 7,550,931 B2 | 6/2009 | Lys et al. |
| 7,566,137 B2 | 7/2009 | Veskovic |
| 7,688,005 B2 * | 3/2010 | Reid .............................. 315/307 |
| 7,729,941 B2 * | 6/2010 | Zampini et al. ............. 705/14.4 |
| 7,792,956 B2 | 9/2010 | Choong et al. |
| 7,845,823 B2 * | 12/2010 | Mueller et al. ................. 362/231 |
| 7,876,233 B2 * | 1/2011 | Dawson et al. ............ 340/815.4 |
| 7,925,384 B2 | 4/2011 | Huizenga et al. |
| 7,948,189 B2 * | 5/2011 | Ahmed ........................... 315/291 |
| 7,999,666 B2 * | 8/2011 | Barrieau et al. ............... 340/506 |
| 8,009,042 B2 * | 8/2011 | Steiner et al. ................. 340/541 |
| 8,077,035 B2 * | 12/2011 | Reid et al. ..................... 340/565 |
| 8,083,367 B2 * | 12/2011 | Anderson et al. .............. 362/147 |
| 8,160,729 B2 * | 4/2012 | Ahmed ............................ 700/47 |
| 8,376,567 B1 * | 2/2013 | Zozula et al. ................. 362/147 |
| 2002/0057204 A1 | 5/2002 | Bligh ........................ 340/691.1 |
| 2003/0189823 A1 * | 10/2003 | George et al. ..................... 362/84 |
| 2004/0002792 A1 | 1/2004 | Hoffknecht |
| 2005/0169643 A1 | 8/2005 | Franklin et al. |
| 2006/0170376 A1 * | 8/2006 | Piepgras et al. .............. 315/295 |
| 2006/0275040 A1 | 12/2006 | Franklin |
| 2007/0016331 A1 * | 1/2007 | Fehr ............................... 700/275 |
| 2007/0057807 A1 | 3/2007 | Walters et al. |
| 2007/0061050 A1 | 3/2007 | Hoffknecht |
| 2007/0086128 A1 | 4/2007 | Lane et al. |
| 2007/0132604 A1 * | 6/2007 | Harwood ................. 340/815.45 |
| 2007/0145915 A1 * | 6/2007 | Roberge et al. ................ 315/312 |
| 2007/0152808 A1 * | 7/2007 | LaCasse ........................ 340/524 |
| 2007/0189001 A1 * | 8/2007 | Nielson et al. ................... 362/16 |
| 2007/0215794 A1 | 9/2007 | Cernasov et al. |
| 2008/0136356 A1 * | 6/2008 | Zampini et al. ................ 315/308 |
| 2008/0185977 A1 | 8/2008 | Veskovic et al. |
| 2008/0244104 A1 | 10/2008 | Clemente |
| 2008/0265796 A1 | 10/2008 | Null |
| 2009/0026966 A1 | 1/2009 | Budde et al. |
| 2009/0179596 A1 | 7/2009 | Willaert et al. |
| 2009/0195161 A1 | 8/2009 | Lane et al. |
| 2010/0034386 A1 | 2/2010 | Choong et al. |
| 2010/0135186 A1 | 6/2010 | Choong et al. |
| 2010/0188023 A1 * | 7/2010 | Anderson et al. ............. 315/312 |
| 2010/0264846 A1 | 10/2010 | Chemal et al. |
| 2010/0270933 A1 | 10/2010 | Chemal et al. |
| 2010/0295482 A1 | 11/2010 | Chemal et al. |
| 2010/0301777 A1 | 12/2010 | Kraemer |
| 2011/0031897 A1 | 2/2011 | Henig et al. |
| 2012/0038479 A1 * | 2/2012 | Ten Wolde .................... 340/540 |
| 2012/0126700 A1 * | 5/2012 | Mayfield et al. ................. 315/86 |

\* cited by examiner

Designating the building fixture as belonging to a logical group of building fixtures, wherein the designating comprises at least one of receiving the designation or the building fixture aiding in the designation

310

Independently controlling, by the building control fixture, at least one of an environmental load or a security device

320

Sharing, by the building control fixture, at least one of sensor or state information with other building fixtures within the logical group of building fixtures, through a communication port of the building control fixture

Each of a plurality of independently controlled lighting fixtures sensing light and/or motion, and independently controlling an intensity of light of the lighting fixture
910

Specifying one or more of the plurality of independently controlled lighting fixtures as belonging to a logical group
920

Each of the lighting fixtures of the logical group additionally controlling the intensity of light of the lighting fixture based on sensing of light and/or motion of another lighting fixture of the logical group
930

FIGURE 9

```
┌─────────────────────────────────────────────────────────────────────────┐
│ Each of a plurality of independently controlled temperature apparatuses │
│ sensing light, motion and/or temperature, and independently controlling │
│ a temperature                                                           │
│                              1010                                       │
└─────────────────────────────────────────────────────────────────────────┘
                                     │
┌─────────────────────────────────────────────────────────────────────────┐
│ Specifying one or more of the plurality of independently controlled     │
│ temperature apparatuses as belonging to a logical group                 │
│                              1020                                       │
└─────────────────────────────────────────────────────────────────────────┘
                                     │
┌─────────────────────────────────────────────────────────────────────────┐
│ Each of the temperature apparatuses of the logical group additionally   │
│ controlling temperature based on sensing of light, motion and/or        │
│ temperature of another temperature apparatus of the logical group       │
│                              1030                                       │
└─────────────────────────────────────────────────────────────────────────┘
```

FIGURE 10

LOGICAL GROUPINGS OF INTELLIGENT BUILDING FIXTURES

RELATED APPLICATIONS

This patent application is a continuation-in-part of U.S. patent application Ser. No. 12/874,331 filed Sep. 2, 2010, which is a continuation-in-part of U.S. patent application Ser. No. 12/584,444 filed Sep. 5, 2009, which claims priority to U.S. Provisional Patent Application No. 61/191,636 filed Sep. 10, 2008, which are herein incorporated by reference.

FIELD OF THE EMBODIMENTS

The described embodiments relate generally to building controls. More particularly, the described embodiments relate to logical groupings of intelligent building fixtures for controlling light, building environment or building security.

BACKGROUND

Building control systems are continually being developed. Building control systems can provide intelligence within a building or structure for improving energy use, user comfort and building security. The complexity of buildings and their control systems have evolved to automatic systems with central points of control. The most common building control systems provide control of lighting and heating. However, control systems for fire and security have become more prevalent as these areas have become more important.

As control systems have become more complex, the technique has always been to provide a central control point which relies on many outlying sensors as this has been the most straight-forward and easily implemented solution. These centralized control systems have always suffered from several serious problems. The largest problem has been failures of the control point itself causing a complete system failure. Various attempts have been tried to introduce redundant control points which add complexity to the control system along with introducing additional failure points.

Other failures occur in the areas of communications, sensors or actuators. These centralized networks have much difficulty in overcoming failures of this type as each system has been manually balanced at the time of set-up.

Centrally controlled building systems can be disadvantageous because all decision making occurs at the controller. Therefore, if the controller becomes inoperative, all devices in the system are no longer under automated control and some or all may not operate even manually. Similarly, if a connection to or from the controller is severed the devices served by that connection are no longer under automated control and also may not operate manually. Partial or system-wide functional changes, such as an immediate need to override current system settings (for example, during a fire or other emergency), cannot be made from anywhere but the controller.

Centrally controlled systems are fundamentally limited when attempting to expand or scale the controlled systems. More specifically, it is expensive to expand and the systems typically require significantly more power to operate.

It is desirable have methods, apparatuses and systems for providing building controls that are easy to expand in size, and do not require excessive amounts of power to operate.

SUMMARY

One embodiment includes a building control system. The building control system includes a plurality of building fixtures and at least one sensor that is interfaced with at least one of the plurality of building fixtures. Further, each building fixture includes a communication port and a controller. For this embodiment, each controller is configured to independently control at least one of an environmental load or a security device, either receive or help designate the building fixture as belonging to a logical group of building fixtures, and share at least one of sensor or state information with other building fixtures within the logical group of building fixtures, through the communication port.

Another embodiment includes a building control apparatus. The building control apparatus includes a communication port and a controller. The controller is configured to independently control at least one of an environmental load or a security device, either receive or help designate the building control apparatus as belonging to a logical group of building control apparatuses, and share at least one of sensor or state information with other building control apparatuses within the logical group, through the communication port.

Another embodiment includes a method of operating a building control fixture. The method includes designating the building fixture as belonging to a logical group of building fixtures, wherein the designating includes at least one of receiving the designation or the building fixture aiding in the designation, independently controlling, by the building control fixture, at least one of an environmental load or a security device, and sharing, by the building control fixture, at least one of sensor or state information with other building fixtures within the logical group of building fixtures, through a communication port of the building control fixture.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 3 is a flow chart that includes steps of an example of a method of operating a building control fixture according to an embodiment.

FIG. 9 is a flow chart that includes steps of another example of a method of an intelligent light controller controlling a light.

FIG. 10 is a flow chart that includes steps of another example of a method of an intelligent light controller controlling a light.

DETAILED DESCRIPTION

The described embodiments are embodied in methods, apparatuses and systems for logical groupings of building fixtures. At least some embodiments of the fixtures include lighting fixtures, while other embodiments include environmental control apparatuses, such as, heating, ventilation and air conditioning (HVAC) devices, and other embodiments include security controls. Embodiments of the building fixtures provide independent, intelligent building controls. The intelligence of each individual building fixture can be enhanced through communication with other building fixtures of logical groupings of the building fixtures. The logical groupings can be designated in one or more ways, and each building fixture of a logical group can utilizing sensed information from one or more of the other building fixtures of the logical group. These embodiments allowing for easy, efficient scaling of building control.

At least some of the described embodiments provide building control systems that operate with distributed intelligence, thereby eliminating problems of the prior building systems. The described embodiments move the intelligence from a central point to the building fixtures themselves.

Embodiments of the building fixtures include devices that are attached to the walls or ceilings of a structure and are used to provide environmental services such as heat or light, or security services such as surveillance or fire protection. Embodiments of the building fixtures can be installed by construction crews in new or remodeled buildings, but can be added as necessary later. The most common fixtures are light fixtures, heating or cooling vents, fans, security cameras, or fire alarms and sensors.

The advent of low-cost microprocessor controllers has allowed the control point to be replicated into each fixture along with communications between controllers, so that centralized control points are no longer needed. The fixtures are now able to operate separately, or in logical groups to control the environment. User control points can be provided as required to allow a user to control one or more logical groupings of fixtures. User control points simply communicate with the network of fixtures to provide the necessary control information. Also system administrators can manage the building functions by setting up or changing logical groupings of fixtures as required to enable proper system operation. Finally, the networks of the describe embodiments provide built-in redundancy, as failed sensors or fixtures can be neutralized and alarmed to keep the fixture network functioning properly.

Figure 1:
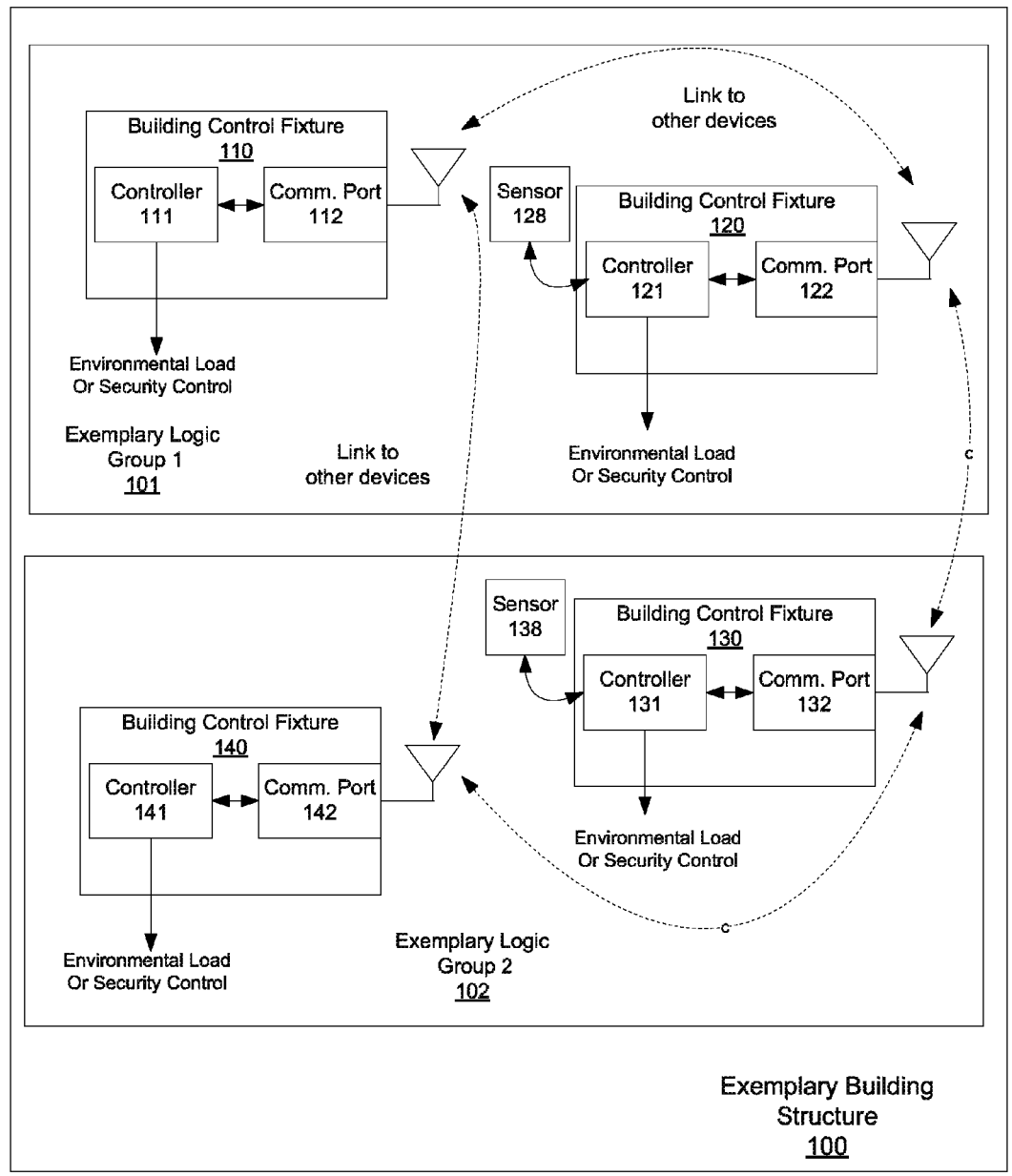
FIG. 1 shows an example of a building control system according to an embodiment.

FIG. 1 shows an example of a building control system according to an embodiment. As shown, the building control system includes a plurality of building fixtures 110, 120, 130, 140 located within, for example, a building structure 100. It is to be understood that the term "building" may be used here to designate of define any structure that may include and benefit from the use of the described building fixtures, such as, any type of indoor room or structure, including, for example, a parking structure.

The building control system includes at least one sensor (such as, sensors 128, 138) interfaced with at least one of the plurality of building fixtures (such as, building fixtures 120, 130). As shown, the building fixtures 110, 120, 130, 140 each include a communication port (such as communication ports 112, 122, 132, 142) and a controller (such as, controllers 111, 121, 131, 141).

As will be described, each controller is configured to independently control at least one of an environmental load or a security device. Each controller is configured to either receive or help designate the building fixture as belonging to a logical group of building fixtures. Additionally, each controller is configured to share at least one of sensor or state information with other building fixtures within the logical group of building fixtures, through the communication port.

FIG. 1 shows exemplary logical groups 101, 102. While the logical groupings of FIG. 1 do not overlap (that is, there is not a building fixture shown as belonging to multiple logical groups), embodiments includes building fixtures belonging to one or more logical groups. As will be described, the logical groups can be dynamic and change over time.

At least some embodiments of the building fixtures (also referred to as building control apparatuses) include a device mounted to a wall or a ceiling of a building. Embodiments of the building fixtures supply a variety of services including light, heat, and cold air as needed. Additionally, or alternatively, multiple of the building fixtures of a logical grouping of building fixtures contain sensors or cameras that are used to provide security and fire control systems throughout, for example, buildings.

One embodiment of a building fixture includes an intelligent light fixture. Light fixtures come in many forms with the fluorescent fixture being the most common in buildings. New fluorescent fixtures can be fitted with special ballasts that allow for dimming.

Another embodiment of a building fixture system includes arrays of ceiling fans such as are often found in buildings where the climate is warm or humid. The speed of the fans where people are present can be made faster. HVAC (heating, ventilation, and air conditioning) systems often have multiple ports in a large room. By controlling the flow or temperature of air in active areas cooling and heating costs can be reduced.

Another embodiment of a building fixture system includes an audio speaker array. By varying sound levels to match activity, audio systems can be made more effective.

Another embodiment of a building fixture system includes surveillance systems. An array of surveillance components such as microphones or cameras lend themselves to intelligent control. Activity can be monitored by the system so the fixtures can focus on areas where people happen to be located.

Another embodiment of a building fixture system includes RFID (radio frequency identification) tag reader arrays. Embodiments of RFID tag systems include badge readers lend themselves to intelligent arrays. It is possible to track and display movements of workers in a building by individual. A system of this nature can make access available to certain people while blocking others. By combining the other surveillance components above with RFID tags, any activity of any individual can be monitored in detail.

Another embodiment of a building fixture system includes a fire alarm system. That is, embodiments of the building fixture system can be used for fire alarm systems. The fixtures can sense and monitor possible fire indicators: carbon monoxide, temperature, smoke, sprinkler status, etc. The system can also check for people in a fire area, fire doors, etc. Activation of a fire alarm box can place the array into a fire mode to track or confirm the alarm in order to lock down elevators, close fire doors, and notify security. Today's fire alarm systems can be expensive to install and maintain. Using an array of intelligent building fixtures can greatly reduce installation and maintenance costs as it can be piggybacked onto an existing array.

Embodiment includes various methods of deploying the described intelligent building fixtures. Generally, four modes of deployment have been identified.

A first mode includes an installation mode. Fixtures are normally be installed by electricians. As each fixture is installed, it may be tested by powering it up. In the installation mode, each fixture responds independently with the fixture turning on or providing an audible or visual indicator when powered up.

A second mode includes a setup mode. Once the installation is finished the array of fixtures enters the setup mode. Two types of setup are possible. A first setup type is automatic. In this mode, the fixtures would learn to communicate with each other. The first step would be for each fixture to identify itself to the other fixtures in the array. The fixtures would be interconnected via a data network. Each fixture would perform a function visible to the adjacent fixtures. In this manner, it is possible to associate the address of a fixture with its physical location. Obstructions such walls would form the boundaries of each array. A typical array would include a single line 1×N (hall), or an M×N array (room). Other geometric shapes are a circle, a ring, a trapezoid, or a triangle. Stairs between floors would be also identified. Once an array of fixtures is recognized, it can later be tagged and associated with a control device, such as a switch, by a system administrator. A second setup type is manual. Manual identification of an array of fixtures would be performed by a system administrator. First, the administrator would identify a fixture using a laser pointer. The administrator would then add each fixture to an array. When the process is performed manually, the administrator would have complete control of the setup process. The administrator would identify the array and assign a switch to control it. When the administrator has finished the setup of the fixtures, he would allow the system to progress to the operational mode.

A third mode includes an operational mode. Fixtures perform as a unit in the operational mode. The arrays previously set up respond to activity or controls such as switches. In the operational mode, the fixtures execute software that has been previously selected by the administrator or downloaded from an external source. This software allows the fixtures to track movement by a person walking along a hall or through a room. Based on the movement, the fixtures tracks or illuminate the party as the party moves through the space. The operational mode also provides for simple additions or replacement of fixtures. Major changes can require the system to enter a teardown mode.

A fourth mode includes a teardown mode. The teardown mode is used when major troubleshooting, repair or changes of the array are needed. The teardown mode restores the system to the installation mode. In that mode, the array can be modified and made ready for setup.

Embodiments of the building control systems include building fixtures that are networked order for the fixtures to communicate they would be part of a data network. The network can be a typical wired or wireless LAN. The network can also be a specialized network such as a wireless Ad-Hoc network, or a Bluetooth network. Another type of network is a data network that communicates over the power lines. This type of network saves having to run special data wiring to each fixture. Each fixture would be assigned a MAC layer address when manufactured which would be used during setup and operation to identify the fixture.

Referring back to FIG. 1, at least one of the building control fixtures (120, 130) is interfaced with a sensor 128, 138. However, another embodiment includes the sensor being physically incorporated into at least one of the building fixtures. Various configurations of the sensor include a light sensor, a motion sensor, or an environment sensor (such as a temperature sensor or humidity sensor). It is to be understood that each sensor can include one of such listed sensors, or any combination of the listed sensors. Other possible types of sensors include, for example, a sound/noise sensor, an intrusion detection sensor, a seismic motion (or structural motion detection) and/or a voltage/current/power meter For at least some embodiments of the building control system of FIG. 1, the building control fixtures 110, 120, 130, 140 are independently operable. That is, each of the fixtures can operate completely independently, and the controller within each fixture is operable without receiving any commands from a central controller. For other embodiments, the fixtures operate in conjunction with other fixtures, such as, other fixtures within a common logical group. For this embodiment, decisions regarding building control can involve a collaborative interaction between multiple fixtures. For other embodiments, one or more fixtures are interfaced with a system controller.

For an embodiment, each controller 111, 121, 131, 141 independently control an environmental load or a security device. More specifically, the controller controls at least one of a lighting intensity, an environmental control, or a building security control. As will be described, the building control fixtures can include lighting (that is, a light in included with the fixture), and the controller of the fixture controls the intensity of light emitted from the light. Alternatively or additionally, the fixture can include environment control, such as, temperature or humidity. For this embodiment, the fixture can be interface or be a part of an HVAC system. Alternatively or additionally, the fixture can interface with or be a part of a building security system.

For at least some embodiments, the controller of each fixture is operative to independently control the environmental load and/or the security device based on at least one of shared sensor or shared state information received from at least one other of the plurality of building fixtures within the logical group. For embodiments, the environmental control includes light, temperature and/or humidity. For embodiments, the shared sensor information includes sense light, motion, temperature, humidity, and other possible sensors. For embodiments, the state information includes, for example, occupancy information, clear state timer, light fixture emitted light intensity.

A fixture may control, for example, an intensity of light emitted from the fixture based at least in part on a sensed parameter from another fixture of the logical group. A fixture may control heat or humidity based on temperature or humidity sensing of other fixtures within the logical group. A fixture may make security decisions based on parameters sensed by other fixtures of the logical group.

A factor that greatly adds to the intelligence of the distributed building control fixtures are the designations of logical groups, wherein building fixtures of a logical group control building parameters based on sensed input from other building control fixtures of the logical group.

For an embodiment, the controller within a building control fixture is operative to help designate one or more of the plurality of building fixtures as belonging to the logical group. That is, the fixtures operate in conjunction with other fixtures, such as, other fixtures within a common logical group. For this embodiment, decisions regarding building control can involve a collaborative interaction between multiple fixtures. For another embodiment, at least a sub-plurality of the plurality of building fixtures auto-determine which building fixtures are included within the logical group.

For an embodiment, fixtures auto-designate logical groups based on location and/or proximity. That is, for one example, each fixture knows their location (for example, x, y and z coordinates) and auto-designates based on a sensed input, and proximity, or a location (for example, x, y and z coordinates) of the sensor that generated the sensed input. Fixtures which are classified into certain categories (e.g. corridor, emergency) affiliate themselves with other fixtures based on commonality of category and proximity. For example, a fixture in a corridor or emergency path will receive motion sensing input from another fixture in the corridor or emergency path and, based on the fact that they are both in the same category and that they are within a distance threshold (proximity) determines that it is in the same motion group as the fixture from which input (sensed) was received.

State another way, for an embodiment, auto-determining includes at least one of the building fixtures receiving a sensed input of a different building fixture, and the at least one building fixture auto-designating itself into a logical group that includes the different building fixture based on a proximity of the at least one building fixture to the different building fixture. For a specific embodiment, the at least one building fixture determines its proximity to the different building fixture based on a three-dimensional x, y, z location of the at least one building fixture relative to a three-dimensional x, y, z location of the different building fixture.

While described in the context of auto-designating groups, it is to be understood that location or proximity information can be used by fixtures to influence operation. That is, for example, a fixture may base its operation based on logical groupings, and additionally, based on the proximity of a sensed input.

For an embodiment, an administrator specifies which of the plurality of building fixtures belong to the logical group. Generally, the administrator specification occurs at installation, and may remain static. For another embodiment, a manual operator specifies which of the plurality of building fixtures belong to the logical group. This can include the operator having a manual control (such as a switch or a set of switches) that allows the manual operator to set and control logical groupings.

An embodiment includes each of the building fixtures of the logical group additionally being operative to receive an input from a device, wherein the building fixture responds to the input if the input includes an identifier associating the input with the logical group. For this embodiment an external controller can interface with particular logical groups based on the unique identifier associated with the logical group. Associating the unique identifiers with logical groups provides for ease of scaling of the number of building fixtures. That is, for example, conventional centrally-controlled systems require either more messages or larger messages to control building fixtures, whereas including unique identifiers with logical groups provides for an efficient system in which the transmitted data doesn't grow or increase as the group grows. Additionally, the system is less reliant on and requires less use of any one communication channel, and therefore, the likelihood of failure due to communication channel use is less.

An embodiment includes building fixtures within the logical group restarting a clear-state-timer upon sensing of motion and/or light by a building fixture within the logical group. The clear-state time can be defined by an occupancy window that estimates, for example, how long a space will be occupied after sensing an occupant. That is, for example, lights can be turned on within a building or structure for a period of the clear-state-timer, which can be estimated by an occupancy window. This embodiment allows members (building fixtures) of a logical group to transition states while maintaining synchronization with each other.

An exemplary method or sequence of events of a clear-state-timer operation includes fixture in motion group detecting motion. For operation of an exemplary set of lighting fixtures, all fixtures in motion group brighten and set an occupancy window of some configured time. At the expiration of the occupancy window, the fixtures should dim/turn off. However, if during the occupancy window, some fixtures in the motion group subsequently detects motion, all fixtures in the motion group reset the occupancy window since the area covered by the motion group is still occupied. After the occupancy window expires, all fixtures dim or turn off.

For an embodiment, sensing of motion and/or light by building fixtures within the logical group within a predetermined amount of time after restarting a lighting on-time are ignored. That is, for example, sensing of light and/or motion is ignored just after lighting of the lighting fixtures. The period of time in which sensed inputs are ignored can be defined a dead-time. The dead time can reduce "chatter" between lights of a logical group. That is, multiple lights within a logical group can near-simultaneously sense a change in motion and/or light which can cause redundant or excess chatter among the lighting fixtures of the logical group.

An embodiment includes a building fixture ignores its own sensing of light and/or motion for a predetermined period of time if the building fixture receives an indication of sensing of light and/or motion from another fixture of the logical group. This process can be defined as "anti-sensing". Anti-sensing can be useful, for example, for preventing a light fixture of an office or a conference room from turning on when someone passes by outside the office or conference room.

Figure 2:
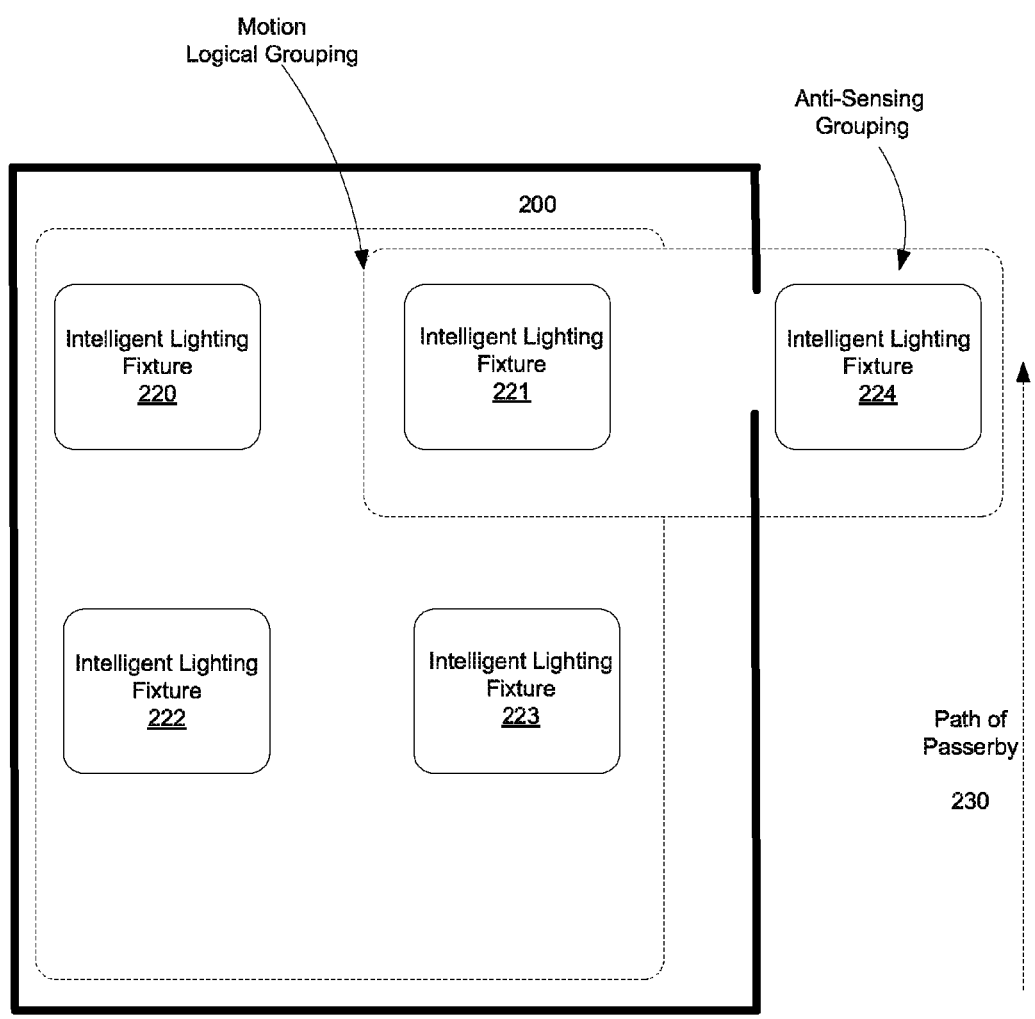
FIG. 2 shows an example of an anti-sensing group of fixtures.

FIG. 2 shows an example of an anti-sensing group of fixtures. An motion sensing group includes fixtures 220, 221, 222, 223. Also as shown, an anti-sensing group is formed that includes the fixture 221 which is location within, for example, a conference room 200, and a second fixture 224 is located outside of the conference room. For this embodiment, if both fixtures 221, 224 in the anti-sensing group detect motion, the fixture 221 in the conference room will ignore its own sensing of motion (anti-sensing) as will the other fixtures 220, 222, 223 within the motion sensing group because the detection of motion by the fixture 224 outside the room indicates that a passerby 230 triggered this motion event.

Various embodiments include different types of logical groups. Exemplary logical group types include, for example, a motion sensing group (previously mentioned), an ambient light group, a logical temperature group, and a logical switch group. Clearly, additional types of logical groups can additionally or alternatively exist. Additionally, a building fixture can belong to any number of different logical groups. Logically grouping of building fixtures is useful for synchronizing members of logical groups, normalizing behavior based on larger samples of data, and/or making better decision based on larger sample of data. Additionally, a fixture being able to belong to any number of different groups is difficult and expensive in centrally controlled systems. As the membership list of fixtures in a centrally controlled system grows, the data that the controller must manage grows, which causes scaling problems.

An exemplary motion sensing group can be utilized, for example, by lighting fixtures located in a corridor. For an embodiment, building fixtures of a corridor determining they are in a corridor, and auto-designate themselves to be included within a common logical group (that is, the motion sensing group). Further, the motion sensing group includes a corridor look-ahead behavior, wherein for the look-ahead behavior, a plurality of overlapping logical groups of building fixtures provide propagation of light along a corridor.

This propagation of light can be used in applications where objects are moving at a high speed and the path of the object's motion needs to be illuminated. Additionally, the corridor look-ahead behavior provides for a safer environment in sparsely populated hallways during the night since individuals moving through the corridor can see farther ahead. By using the corridor look-ahead behavior, the motion sensing group can achieve an effective mix of safety and energy efficiency because the appropriate level of light is provided without having to illuminate the entire corridor (as is the case with many traditional lighting control systems).

For the ambient light group, an embodiment includes at least a subset of the plurality building fixtures auto-designating themselves to be within the ambient light group. The auto or self designation of the light can be made, for example, by the at least a subset of the plurality of light determining that they receive a change of light near-simultaneously (that is, for example, within a defined time slot).

For an embodiment, if at least one of the building fixtures of the logical group sense a motion and/or light sensing blindness condition, then the at least one building fixture retrieving sensing information from other building fixtures within a common logical group to determine motion and/or ambient light level, and the building fixture responds accordingly. That is, a building fixture (such as a lighting fixture) solicits information from others in logical group if the lighting fixture is blind. It is to be understood that the same concept can be extended to other sensor as well, such as, motion sensors or temperature sensors.

For a logical switching group, an embodiment includes the logical group being designated by a group id, and building fixtures that are members of the logical group having the group id are controlled by a logical switch or a physical switch. For an embodiment, the member building fixtures are controlled to provide predetermined scenes.

For example, a conference room might have predetermined scenes which dim the fixtures near a projector screen or group viewing monitor. Other scenes can include optimizing light levels for specific tasks (for example, task tuning).

An embodiment includes at least one building fixture of the logical group receiving a reference or baseline value for at least one of motion and/or light sensor input from another building fixture in the logical group. For example, a lighting fixture solicits the ambient light level from another lighting fixture in the logical group to establish a reference for the minimum light level in a particular building location. Further, the lighting fixture may receive the input from the other fixture(s) in the group, and then compare its own measured (sensed) values against the received values to make a decision. For example, the received values could be a target (such as a heating or cooling target, and further the fixture adjusting its temperature until it reaches the target). For another embodiment, the building fixture uses the received value to determine some external factor. For example, the value received from a fixture located outside can be used to determine outside temperature which can be used to aid in adjustment of an inside temperature. Clearly, these embodiments can be extended beyond just temperature control.

For the logical temperature group, an embodiment includes a building fixture receiving at least one of an occupancy (motion) input and a temperature sensor input from at least one of the other fixtures in the logical group to control an environmental load. For other embodiments, this can further include the building fixture controlling the environmental load by averaging the temperatures of all the building fixtures in the logical group. Additionally or alternatively, embodiments include the building fixture controlling the environmental load, for example, using only the temperatures of building fixtures in the logical group which are reporting occupancy. For embodiments, the environment is controlled only in places that matter, such as, occupied spaces. The described embodiments allow from determination of whether a space is really occupied, are whether one is merely passing through the spaces.

FIG. 3 is a flow chart that includes steps of an example of a method of operating a building control fixture according to an embodiment. A first step 310 includes designating the building fixture as belonging to a logical group of building fixtures, wherein the designating comprises at least one of receiving the designation or the building fixture aiding in the designation. A second step 320 includes independently controlling, by the building control fixture, at least one of an environmental load or a security device. A third step 330 includes sharing, by the building control fixture, at least one of sensor or state information with other building fixtures within the logical group of building fixtures, through a communication port of the building control fixture.

As previously described, and embodiment further comprising the building control fixture receiving a sensor input, wherein the sensor input includes at least one of light, motion, or an environmental condition.

Figure 4:
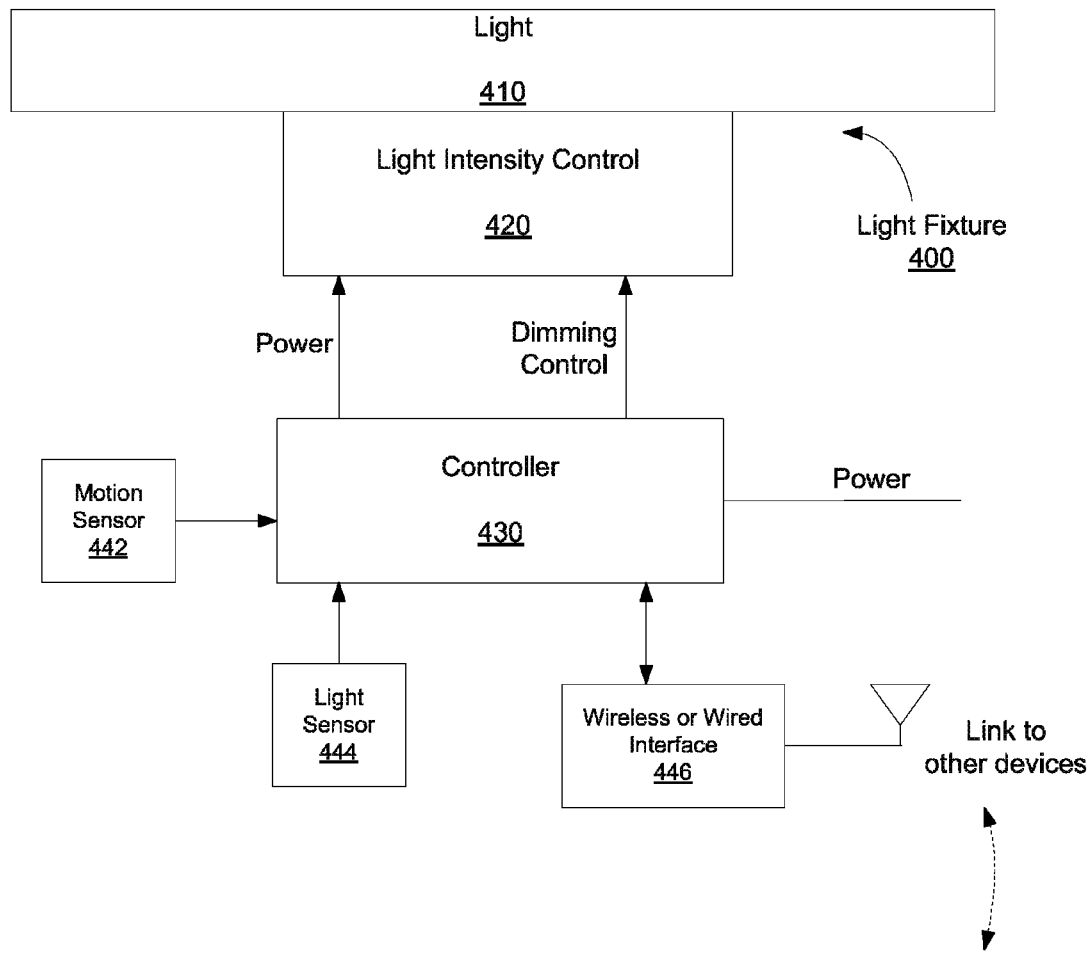
FIG. 4 shows a building fixture that provides lighting control according to an embodiment.

FIG. 4 shows an example of an intelligent lighting fixture 400. A controller 430 provides dimming and/or power control to a light 410 through a light intensity control (such as, a dimming ballast) 420. For an embodiment, the light intensity control 420 receives a power input and a dimming control input, and provides a regulated current to the light 410.

The intelligent light controller 430 communicates with other devices through a wireless or wired interface 446. The other devices include, for example, an authorized (manager) device, one or more other intelligent lighting fixtures.

As a part of for example, an energy-savings mode of the intelligent light controller 430, the intelligent light controller 430 receives inputs from sensors, such as, a motion sensor 442 and/or a light sensor 444. Clearly, other sensors can be utilized as well.

For at least some embodiments, the light 410 is a gas-discharge lamp, which is typically a negative-resistance device. Such devices cannot effectively regulate their current use. If such a device were connected to a constant-voltage power supply, it would draw an increasing amount of current until it was destroyed or caused the power supply to fail. To prevent this situation, a ballast (such as the dimming ballast 420) provides a positive resistance that limits the ultimate current to an appropriate level. In this way, the ballast provides for the proper operation of the negative-resistance device by appearing to be a legitimate, stable resistance in the circuit.

Figure 5:
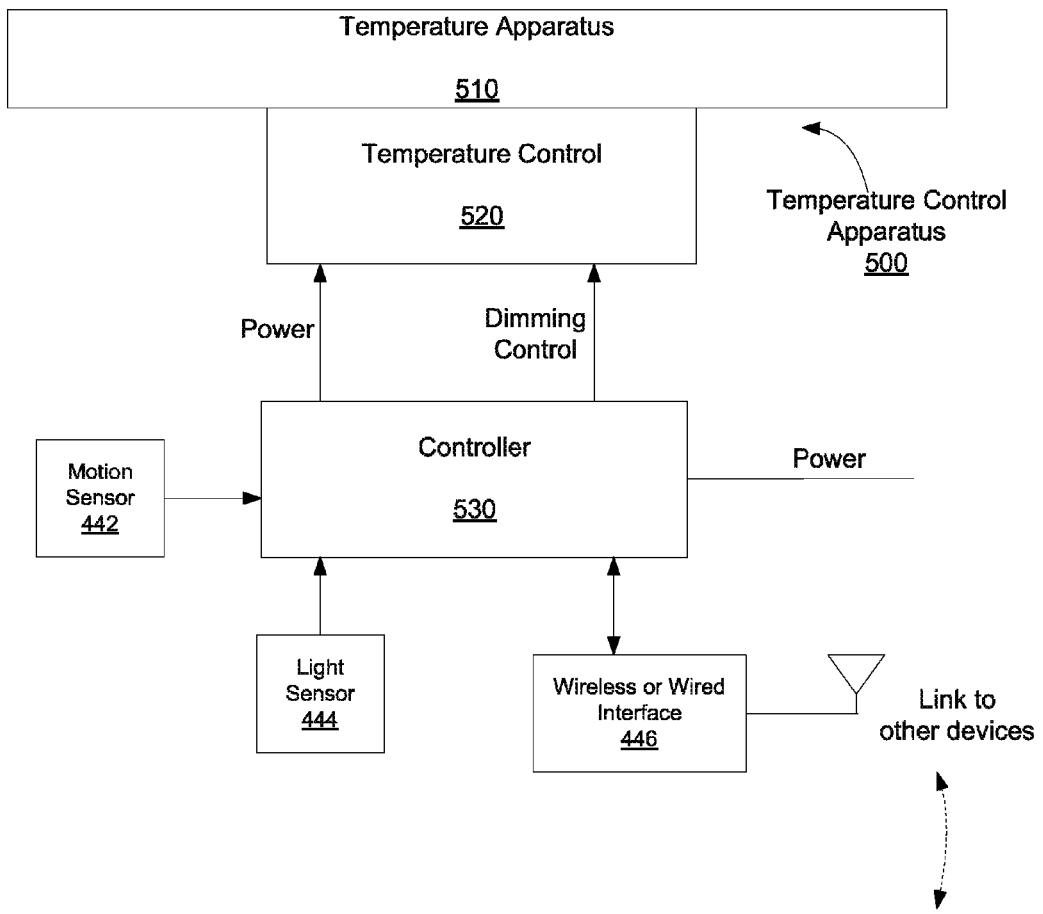
FIG. 5 shows a building fixture that provides environmental control according to an embodiment.

FIG. 5 shows an example of an intelligent temperature control apparatus 500. The temperature control apparatus can be, for example, at least a part of a HVAC system. A controller 530 provides temperature control to a temperature apparatus 510 through, for example, a temperature controller 520. This embodiment includes similar sensors 442, 444 and communication interface 446.

FIG. 5 exemplifies that the logical grouping control for lighting of the described embodiments can be extended to, for example, temperature control. That is, sensing conditions, such as, temperature, motion and/or light of one temperature control apparatus can be used to aid in the control of another temperature control apparatus.

Figure 6:
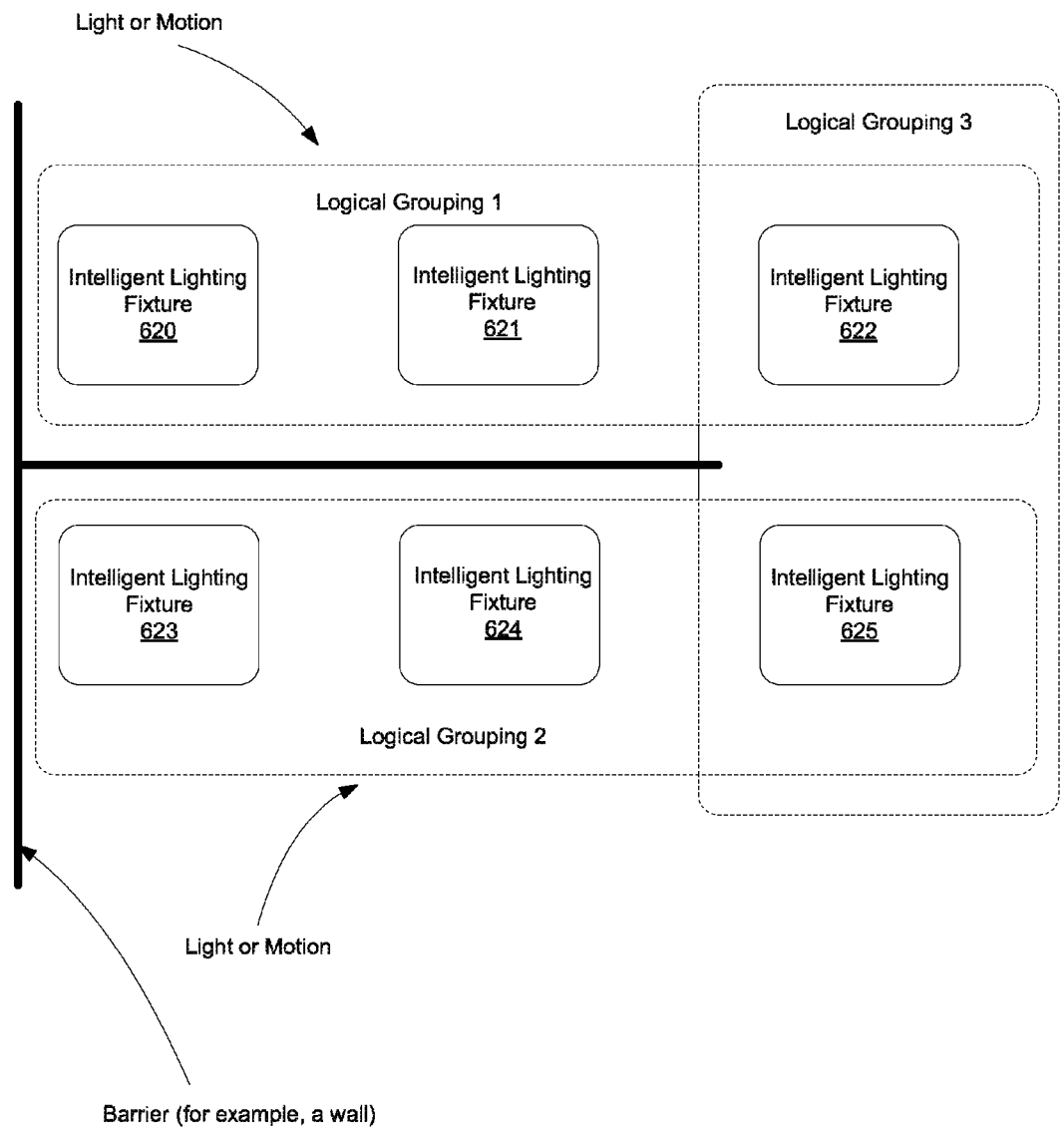
FIG. 6 shows an example of a lighting system that includes logical groupings of intelligent lighting fixtures.

FIG. 6 shows an example of a lighting system that includes logical groupings of intelligent lighting fixtures. For example, a first logical group (grouping 1) includes intelligent lighting fixtures 620, 621, 622, and a second logical group (grouping 2) includes intelligent lighting fixtures 623, 624, 625, and a third logical group (grouping 3) includes intelligent lighting fixtures 622, 625.

Different embodiments include the logical groupings being made in different ways. For example, the logical groupings can be made by commonality of motion and/or light sensing of the groups. The logical groupings can be predefined by a lighting system manager.

As shown in FIG. 6, an exemplary barrier, such as, a wall defines the logical groupings. For example, due to the presence of the wall, a natural logical group 1 and logical group 2 can result. That is, light or motion sensed by the members of the logical group 1 may not be sensed or be relevant to the members of the logical group 2. Additionally, a third logical group 3 may have commonality in sensing within themselves, but be different than those of logical groups 1 and 2.

For at least some embodiments, each of the intelligent light fixtures operate independently, but can receive additional information from sensors of other intelligent light fixtures within a common logical group. As shown in FIG. 6, intelligent lighting fixtures can belong to multiple logical groups. The logical groupings can be dynamic and defined in multiple ways.

A system operator can predefine logical groups, and the system operator can later change the logical groupings. Additionally, as previously described the intelligent lighting fixtures can define logical groupings themselves.

Figure 7:
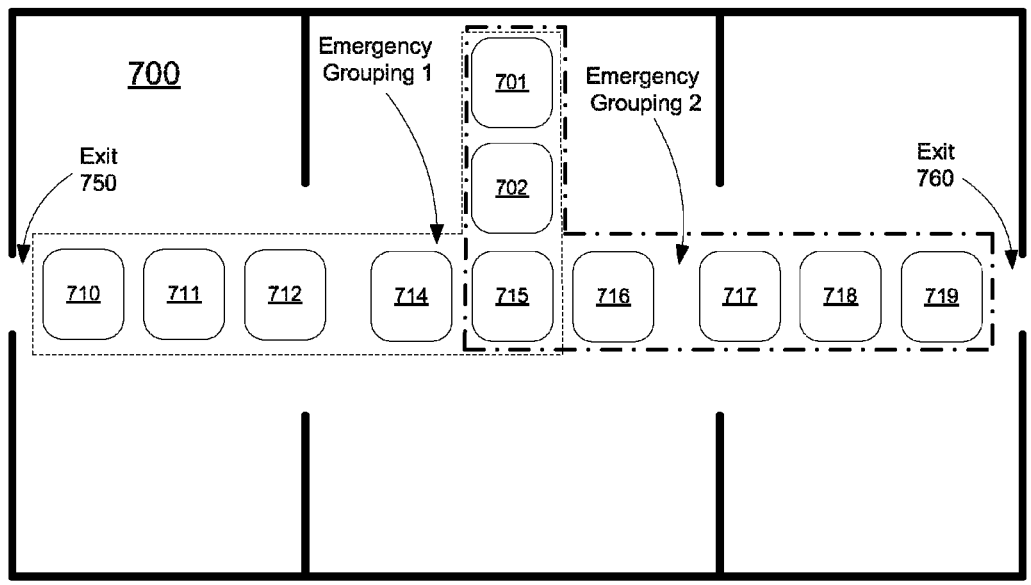
FIG. 7 shows an example of emergency path groups of fixtures.

FIG. 7 shows an example of emergency path groups of fixtures. The emergency path logical groups can be designated by any of the described methods. Once designated, the logical groupings can work individually or in combination to provide at least one indicator of a safe path for occupants of a building structure 700. A first emergency logical group includes building fixtures 710, 711, 712, 714, 715, 702, 701, while a second emergency logical grouping includes fixtures 701, 702, 715, 716, 717, 718, 719. If an emergency indicator is received by one or more of the building fixtures, the building fixtures or corresponding emergency logical groups can respond. For example, lights of the emergency logical groups can flash or provide some sort of an alert to occupants of the building structure 700 that an emergency condition exists. The emergency condition can come from anywhere (such as an internal or external sensor), and indicate any type of emergency (such as, fire, flood, smoke, earthquake, ect.). Once the emergency indicator has been received, emergency logical groups can additionally used sensors of other fixtures to deduces and determine, for example, safe exist paths for occupants. For example, if the building fixture 719 senses heat or smoke in the vicinity of the building fixture 719, either one or both of the emergency logical groups (1 or 2) can provide one or more indicators (such as arrows are other indicators of direction) that provide a safe path for occupants to, for example, exit 750, or away from exit 760. For example, the indicators can provide a safe path away from the building fixture 719 (near exit 760) in which smoke or heat has been sensed.

State in another way, for an embodiment, the logical groups comprise emergency path groups, and the emergency path groups respond to reception of an emergency indicator, and further respond to sensed conditions of one or more sensors of other fixtures. Further, for an embodiment, the emergency path group provides a safe path indicator for directing occupants to a safe path when the emergency indicator is received.

Figure 8:
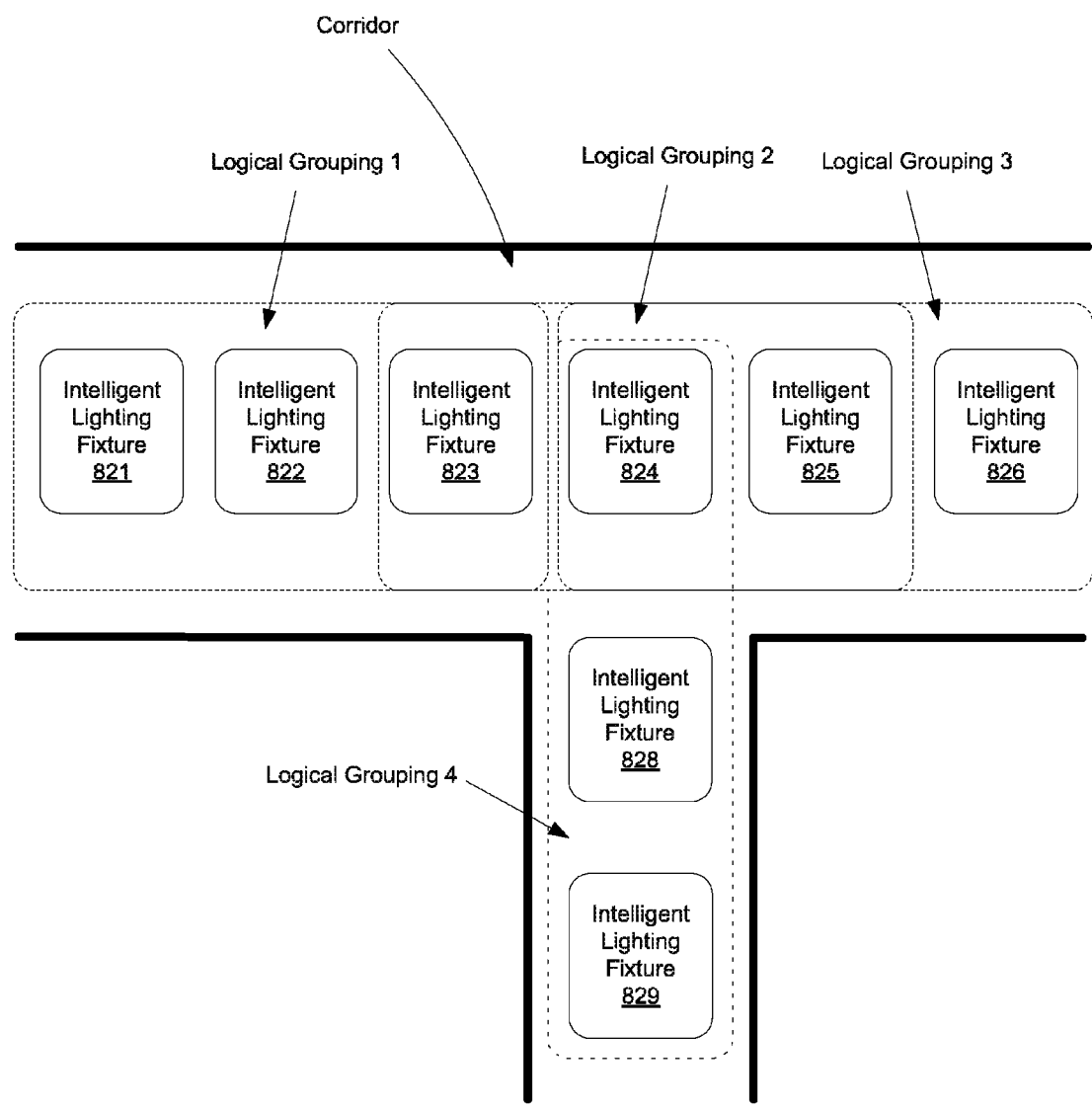
FIG. 8 shows an example of logical groupings of intelligent lighting fixtures within a corridor.

FIG. 8 shows an example of logical groupings of intelligent lighting fixtures within a corridor. As shown, a first logical grouping of intelligent lighting controllers can include intelligent lighting fixtures 821, 822, 823, a second grouping of intelligent lighting controllers can include intelligent lighting fixtures 823, 824, 825, a third grouping of intelligent lighting controllers can include intelligent lighting fixtures 824, 825, 826, and a fourth group of intelligent lighting controllers can include intelligent lighting fixtures 824, 828, 829.

As a user travels down the corridor, the intelligent lighting fixtures can each forecast the arrival of the user by utilizing information from other intelligent lighting fixtures within the same logical grouping. For example, intelligent lighting fixture 823 can be alerted that a user is nearby and likely to be traveling near the intelligent lighting fixture 823 through motion sensors of the intelligent lighting fixture 821, which is in the same logical group as the lighting fixture 823. Similarly, intelligent lighting fixture 824 can be alerted that a user is nearby and likely to be traveling near the intelligent lighting fixture 824 through motion sensors of the intelligent lighting fixture 829, which is in the same logical group as the lighting fixture 824. The control of each individual intelligent lighting fixture is made more intelligent by providing the intelligent lighting fixture with information of sensors of other intelligent lighting controllers of common logical groups.

FIG. 9 is a flow chart that includes the steps of a method of distributed lighting control according to an embodiment. A first step 910 includes each of a plurality of independently controlled lighting fixtures sensing light and/or motion, and independently controlling an intensity of light of the lighting fixture. A second step 920 includes specifying one or more of the plurality of independently controlled lighting fixtures as belonging to a logical group. A third step 930 includes each of the lighting fixtures of the logical group additionally controlling the intensity of light of a lighting fixture based on sensing of light and/or motion of another lighting fixture of the logical group.

For at least some embodiments, at least one of the plurality of independently controlled lighting fixtures belongs to a plurality of logical groups. Further, at least some embodiments include a central system administrator that specifies which lighting fixtures belong to the logical group, while other embodiments include a manual operator that specifies which lighting fixtures belong to the logical group.

For at least some embodiments, at least a sub-plurality of the plurality of independently controlled lighting fixtures auto-determines the logical group. For example, a single switch can cause the sub-plurality of lighting fixtures to reboot. The sub-plurality of lights can detect the near-simultaneous rebooting of the sub-plurality of lights and, therefore, self or auto designate themselves as belonging to the logical group.

For at least some embodiments, lighting fixtures within the logical group restart an on time for the lighting upon sensing of motion and/or light by a lighting fixture within the logical group. Further, sensing of motion and/or light by lighting fixtures within the logical group within a predetermined amount of time after restarting a lighting on-time are ignored. That is, just after lighting of the lighting fixtures, following sensing of light and/or motion is ignored, defining a deadtime. This can reduces "chatter" between lights of a logical group. That is, multiple lights within a logical group can near-simultaneously sense a change in motion and/or light which can cause redundant or excess chatter among the lighting fixtures of the logical group.

At least some embodiments includes anti-motion, wherein if a lighting fixture receives an indication of sensing of light and/or motion from another lighting fixture, the lighting fixture ignores its own sensing of light and/or motion for a predetermined period of time.

At least some embodiments include deferral, wherein if at least one lighting fixture of a logical group senses light sensing blindness, an excessive false motion condition, or some other suspect sensor input, the lighting fixtures sensing suspect sensor input retrieve sensor input from other lighting fixtures within the logical group and ignore their own input. That is, the lighting fixtures solicit information from others in the logical group if the lighting fixtures' sensors are providing bad input.

For at least some embodiments, the logical group comprises a motion sensing group. For a specific embodiment, lighting fixtures of a corridor determine they are in a corridor, and auto-designate themselves to be included within a logical group. For a specific embodiment, the motion sensing group includes a corridor look-ahead behavior, comprising a plurality of overlapping logical groups of lighting fixtures that provide propagation of light along a corridor.

For at least some embodiments, the logical group includes an ambient light group. For a specific embodiment, at least a subset of the plurality of lights auto-designate themselves to be within a logical group. The auto or self designation of the light can be made, for example, by the subset of the plurality of lights determining that they receive a change of light near-simultaneously (within a defined time slot). For an embodiment, if at least one of the lighting fixtures of the logical group sense a light sensing blindness condition, the at least one lighting fixture retrieves sensing information from other lighting fixtures within a common logical group to determine an ambient light level, and the lighting fixture responds accordingly. That is, the lighting fixture solicits information from others in logical group if the lighting fixture is blind.

For at least some embodiments, the logical group includes a logical switch group. For a specific embodiment, the logical group is designated by a group id, and lighting fixtures that are members of the logical group having the group id are controlled by at least one of a logical switch and a physical switch, wherein the member light fixtures are controlled to provide predetermined scenes.

FIG. 10 is a flow chart that includes the steps of a method of distributed temperature control according to an embodiment. A first step 1010 includes each of a plurality of independently controlled temperature apparatuses sensing temperature, light, and/or motion, and independently controlling a temperature. A second step 1020 includes specifying one or more of the plurality of independently controlled temperature apparatuses as belonging to a logical group. A third step 1030 includes each of the temperature apparatuses of the logical group additionally controlling temperature based on sensing of temperature, light and/or motion of another temperature apparatus of the logical group.

Although specific embodiments have been described and illustrated, the described embodiments are not to be limited to the specific forms or arrangements of parts so described and illustrated. The embodiments are limited only by the appended claims.

What is claimed:

1. A building control system, comprising:
    a plurality of building fixtures;
    wherein
        at least one of building fixture of the plurality of building fixtures comprising;
            an interface to at least one sensor;
            a communication port;
            a controller, the controller configured to:
                independently control at least one of an environmental load or a security device;
                aid in designating the at least one building fixture as belonging to a logical group of building fixtures, comprising at least a sub-plurality of the plurality of building fixtures auto-determining the logical group;
                share information of the at least one sensor with other building fixtures within the logical group of building fixtures, through the communication port; and
                receive other sensor information from at least one of the other building fixtures within the logical group of building fixtures, through the communications port.

2. The building control system of claim 1, wherein the at least one sensor is incorporated into the at least one building fixture.

3. The building control system of claim 1, wherein the at least one sensor comprises at least one of a light sensor, a motion sensor, or an environment sensor.

4. The building control system of claim 1, wherein the controller is operable without receiving any commands from a central controller.

5. The building control system of claim 1, wherein the controller independently controlling at least one of an environmental load and a security device comprises the controller controlling at least one of a lighting intensity, an environmental control, or a building security control.

6. The building control system of claim 1, further comprising the controller operative to independently control the at least one of the environmental load or the security device based on at least one of the shared sensor or shared state information received from at least one other of the plurality of building fixtures within the logical group.

7. The building control system of claim 1, wherein auto-determining comprises the at least one building fixtures receiving a sensed input of a different building fixture, and the at least one building fixture auto-designating itself into a logical group that includes the different building fixture based on an proximity of the at least one building fixture to the different building fixture.

8. The building control system of claim 7, wherein the at least one building fixture determines its proximity to the different building fixture based on a three-dimensional x, y, z location of the at least one building fixture relative to a three-dimensional x, y, z location of the different building fixture.

9. The building control system of claim 1, further comprising the controller configured to additionally control at least one of the environmental load or the security device based on proximity of the at least one building fixture to a sensed input.

10. The building control system of claim 1, further comprising each building fixtures of the logical group of building fixtures additionally operative to receive an input from a device, wherein the building fixture responds to the input if the input includes an identifier associating the input with the logical group.

11. The building control system of claim 1, further comprising building fixtures within the logical group restarting a clear-state-timer upon sensing of motion or light by a building fixture within the logical group.

12. The building control system of claim 11, wherein sensing of motion or light by building fixtures within the logical group within a predetermined amount of time after restarting a lighting on-time are ignored.

13. The building control system of claim 1, wherein if a building fixture receives an indication of sensing of light or motion, the building fixture ignores its own sensing of light or motion for a predetermined period of time.

14. The building control system of claim 1, wherein the logical group comprises a motion sensing group.

15. The building control system of claim 14, wherein the motion sensing group comprises a corridor look-ahead behavior, comprising a plurality of overlapping logical groups of building fixtures that provide propagation of light along a corridor.

16. The building control system of claim 1, wherein the logical group comprises an ambient light group.

17. The building control system of claim 1, wherein the logical group comprises a logical switch group.

18. The building control system of claim 17, wherein the logical group is designated by a group id, and building fixtures that are members of the logical group having the group id are controlled by at least one of a logical switch and a physical switch, wherein the member building fixtures are controlled to provide predetermined scenes.

19. The building control system of claim 1, wherein at least one building fixture of the logical group receives a reference or baseline value for at least one of a motion sensor input or a light sensor input from another building fixture in the logical group.

20. The building control system of claim 1, wherein the logical group comprises a logical temperature group.

21. The building control system of claim 20, wherein a building fixture receives at least one of an occupancy input and a temperature sensor input from at least one of the other fixtures in the logical group to control an environmental load.

22. The building control system of claim 1, wherein the logical group comprises an emergency path groups, and wherein the emergency path group responds to reception of an emergency indicator, and further responds to sensed conditions of one or more sensors of other building fixtures.

23. The building control system of claim 22, wherein the emergency path group provides a safe path indicator for directing occupants to a safe path when the emergency indicator is received.

24. A building control system, comprising:
a plurality of building fixtures;
wherein
  at least one of building fixture of the plurality of building fixtures comprising;
    an interface to at least one sensor;
    a communication port;
    a controller, the controller configured to:
      independently control at least one of an environmental load or a security device;
      aid in designating the at least one building fixture as belonging to a logical group of building fixtures, wherein the logical group comprises a motion sensing group;
      share information of the at least one sensor with other building fixtures within the logical group of building fixtures, through the communication port; and
      receive other sensor information from at least one of the other building fixtures within the logical group of building fixtures, through the communications port; and
further comprising building fixtures of a corridor determining they are in a corridor, and auto-designating themselves to be included within a common logical group.

25. A building control system, comprising:
a plurality of building fixtures;
wherein
  at least one of building fixture of the plurality of building fixtures comprising;
    an interface to at least one sensor;
    a communication port;
    a controller, the controller configured to:
      independently control at least one of an environmental load or a security device;
      aid in designating the at least one building fixture as belonging to a logical group of building fixtures, wherein the logical group comprises an ambient light group;
      share information of the at least one sensor with other building fixtures within the logical group of building fixtures, through the communication port; and
      receive other sensor information from at least one of the other building fixtures within the logical group of building fixtures, through the communications port; and
further comprising at least a subset of the plurality building fixtures auto-designating themselves to be within the ambient light group.

26. A building control system, comprising:
a plurality of building fixtures;
wherein
  at least one of building fixture of the plurality of building fixtures comprising;
    an interface to at least one sensor;
    a communication port;
    a controller, the controller configured to:
      independently control at least one of an environmental load or a security device;
      aid in designating the at least one building fixture as belonging to a logical group of building fixtures;
      share information of the at least one sensor with other building fixtures within the logical group of building fixtures, through the communication port; and
      receive other sensor information from at least one of the other building fixtures within the logical group of building fixtures, through the communications port;
    wherein if at least one of the building fixtures of the logical group that senses a motion or light senses a blindness condition, then the at least one building fixture retrieving sensing information from other building fixtures within a common logical group to determine a motion level or an ambient light level.

27. A building control apparatus, comprising:
an interface to at least one sensor;
a communication port;
a controller, the controller configured to:
  independently control at least one of an environmental load or a security device;
  aid in designating the building control apparatus as belonging to a logical group of building control apparatuses, comprising at least a sub-plurality of the plurality of building fixtures auto-determining the logical group;
  share sensor information of the at least one sensor with other building control apparatuses within the logical group, through the communication port; and
  receive other sensor information from at least one of the other building fixtures within the logical group of building fixtures, through the communications port.

28. The building control apparatus of claim 27, wherein the at least one sensor senses at least one of light, motion, or an environmental condition.

29. The building control apparatus of claim 27, the controller independently controlling at least one of an environmental load and a security device comprises the controller controlling at least one of a lighting intensity, an environmental control, or a building security control.

30. The building control apparatus of claim 27, further comprising the controller operative to independently control the at least one of the environmental load or the security device based on at least one of the shared sensor or shared state information received from at least one other of the plurality of building control apparatuses within the logical group.

31. The building control apparatus of claim 27, further comprising the building control apparatus restarting a clear-state-timer upon sensing of motion or light by at least one building control apparatus within the logical group.

32. The building control apparatus of claim 31, wherein sensing of at least one of motion and light by at least one building control apparatus within the logical group within a predetermined amount of time after restarting a lighting on-time are ignored.

33. The building control apparatus of claim 27, wherein if at least one other building control apparatus of the plurality of building control apparatuses of the logical group receives an indication of sensing of light or motion, the building control apparatus ignores its own sensing of light or motion for a predetermined period of time.

34. A method of operating a building control fixture, comprising:
   aiding, by the building control fixture, in designating the building control fixture as belonging to a logical group of building fixtures, comprising at least a sub-plurality of the plurality of building fixtures auto-determining the logical group;
   receiving, by the building control fixture, sensor information from a least one sensor interfaced with the building control fixture;
   independently controlling, by the building control fixture, at least one of an environmental load or a security device; and
   sharing, by the building control fixture, the sensor information with other building fixtures within the logical group of building fixtures, through a communication port of the building control fixture.

35. The method of claim 34, wherein the sensor information comprises at least one of light, motion, or an environmental condition.

36. The method of claim 34, wherein independently controlling at least one of an environmental load and a security device comprises controlling, by the building control fixture, at least one of a lighting intensity, an environmental control, or a building security control.

37. The method of claim 34, further comprising independently controlling the at least one of the environmental load or the security device based on at least one of the shared sensor or shared state information received from at least one other of the plurality of building fixtures within the logical group.

38. The method of claim 34, further comprising building fixtures within the logical group restarting, by the building fixture, a clear-state-timer upon sensing of motion or light by at least one other building fixture within the logical group.

39. The method of claim 34, wherein sensing of motion or light by building fixtures within the logical group within a predetermined amount of time after restarting a lighting on-time are ignored.

40. The method of claim 34, wherein if the building fixture receives an indication of sensing of light or motion, the building fixture ignores its own sensing of light or motion for a predetermined period of time.

* * * * *